United States Patent

Okuniewicz et al.

[19]

[11] Patent Number: 6,151,847

[45] Date of Patent: Nov. 28, 2000

[54] WINDOW GLASS SPACER

[75] Inventors: Michael Okuniewicz, Royal Oak; Robert R. Stieg, Macomb, both of Mich.

[73] Assignee: DaimlerChrysler Corporation, Auburn Hills, Mich.

[21] Appl. No.: 09/326,442

[22] Filed: Jun. 4, 1999

[51] Int. Cl.[7] ........................................ B60J 1/00
[52] U.S. Cl. ............................ 52/204.591; 52/204.597; 52/208; 296/96.21; 296/146.15; 296/201
[58] Field of Search ....................... 52/708, 204.591, 52/204.597; 296/96.21, 146.15, 201

[56] References Cited

U.S. PATENT DOCUMENTS

| | | |
|---|---|---|
| 3,879,241 | 4/1975 | Butler . |
| 4,249,356 | 2/1981 | Noso ............................. 296/96.21 X |
| 4,505,511 | 3/1985 | Hänle et al. . |
| 5,013,077 | 5/1991 | Stevens ........................... 296/96.21 |
| 5,308,135 | 5/1994 | Stedman ......................... 296/96.21 |
| 5,489,135 | 2/1996 | Lipinski . |
| 5,528,868 | 6/1996 | Yada et al. . |
| 5,529,366 | 6/1996 | Gold . |
| 5,531,496 | 7/1996 | Zbinden et al. . |
| 5,538,314 | 7/1996 | Young et al. . |
| 5,586,798 | 12/1996 | Saegusa ......................... 296/96.21 X |

*Primary Examiner*—Christopher T. Kent
*Attorney, Agent, or Firm*—Lawrence J. Shurupoff

[57] ABSTRACT

A window glass spacer is provided which includes a base. The base has a tapered recess for locating and centering the base on a frame of a vehicle. The base has, on opposite sides, clip-type clamps for connecting the base with a frame of an automotive vehicle adjacent a bottom end of a window glass opening. A cantilever support arm is connected with the base and a compliant pad is connected on the arm to support the window glass in a direction generally perpendicular to a major plane of the window glass. A plurality of cantilever spring fingers extend from the base. Each finger has a window glass support member provided on the end of the cantilever spring finger. The cantilever fingers having a serially decreasing length so that the position of the window glass with respect to a top end of the window glass opening can remain constant despite variations in window glass opening dimensions.

9 Claims, 9 Drawing Sheets

WINDOW GLASS SPACER

BACKGROUND OF THE INVENTION

1. Field of the Invention

The present invention relates, in general, to spacers used in the assembly of window glass, such as a windshield or rear window, to a motor vehicle frame body. In particular, the present invention relates to a length adjustable spacer located between the window glass and a sheet metal perimeter flange edge which surrounds a window glass opening of an automobile.

2. Description of Prior Developments

A window glass opening in a vehicle is provided by a series of sheet metal stampings. The sheet metal stampings are welded together to form a peripheral flange to set the window glass into. When assembling the window glass to the vehicle, a bead of urethane is applied to the periphery of the passenger side of the window glass which faces is the peripheral flange of the opening. The window glass is then sent into the opening flange and the urethane bonds and seals the window glass to the vehicle frame. The urethane takes many hours to set up and cure, therefore some form of support is required for locating the window glass vertically in the opening and for supporting the window glass away from the peripheral flange until the bonding and sealing of the urethane is complete. In the past, a generally compliant support was typically located between the passenger side of the window glass and the peripheral flange for spacing the window glass away from the peripheral flange to allow the bead of urethane to set up and cure with a predetermined thickness or height. A second set of spacers were provided to set the vertical location of the window glass within the opening. Therefore, either two types of spacers are required or the spacers utilized must perform two separate functions.

With most high quality high volume production methods, the distance from the bottom edge of the window opening to the top edge of the window opening can vary by a centimeter or more. The top edge of the window opening is exposed, however, the bottom edge of the window opening is typically hidden from view. For aesthetic, noise, and sealing reasons, the gap between the window glass and the top edge of the window opening should be as small as possible. Therefore, the spacer which vertically supports the window glass in position while the urethane is curing needs to be adjustable in length, to compensate for the variations in the distance between the bottom edge of the window opening and the top edge which can occur from vehicle to vehicle.

A prior vertically adjustable length spacer 20 (FIGS. 14 and 15) had a base 22 with a plurality of extending variable length fingers 24. The spacer 20 also had a compliant pad 26 to support the window glass away from the peripheral flange 28 of the window glass opening. The base 22 was shaped generally as a U with opposed legs 23 and 25. The base legs were pushed over an extending flange or ridge 30 of the sheet metal. The base legs 23 and 25 were retained to the ridge by friction and by a slight spring force of the legs 23, 25 towards one another. The ridge 30 was either adjacent or integral with the lower flange 28.

Figure 14:
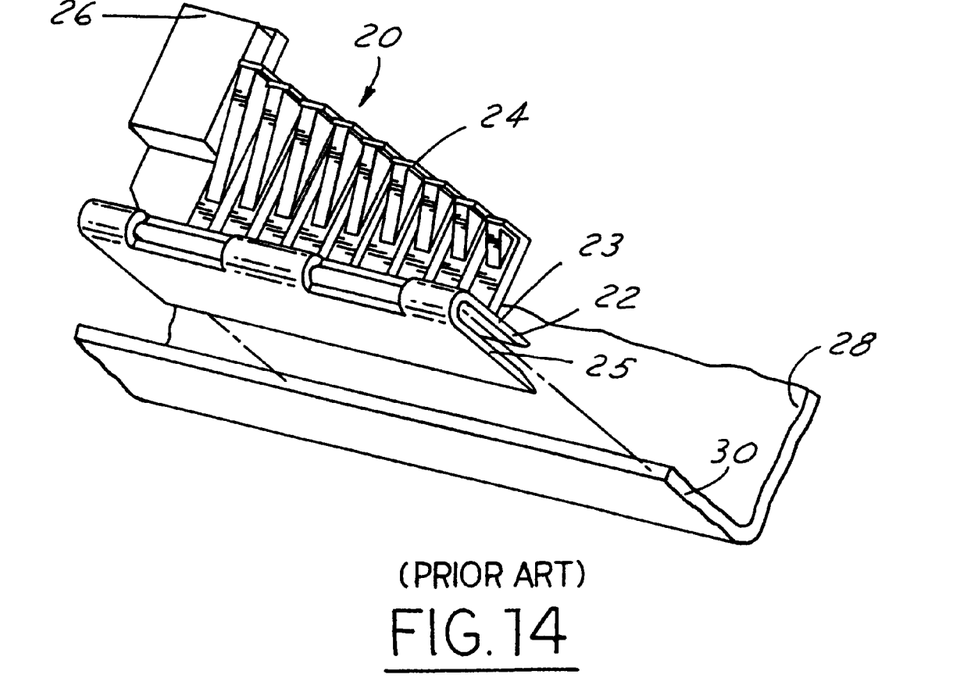
FIG. 14 is a pre-installed view of a prior art window spacer.
Figure 15:
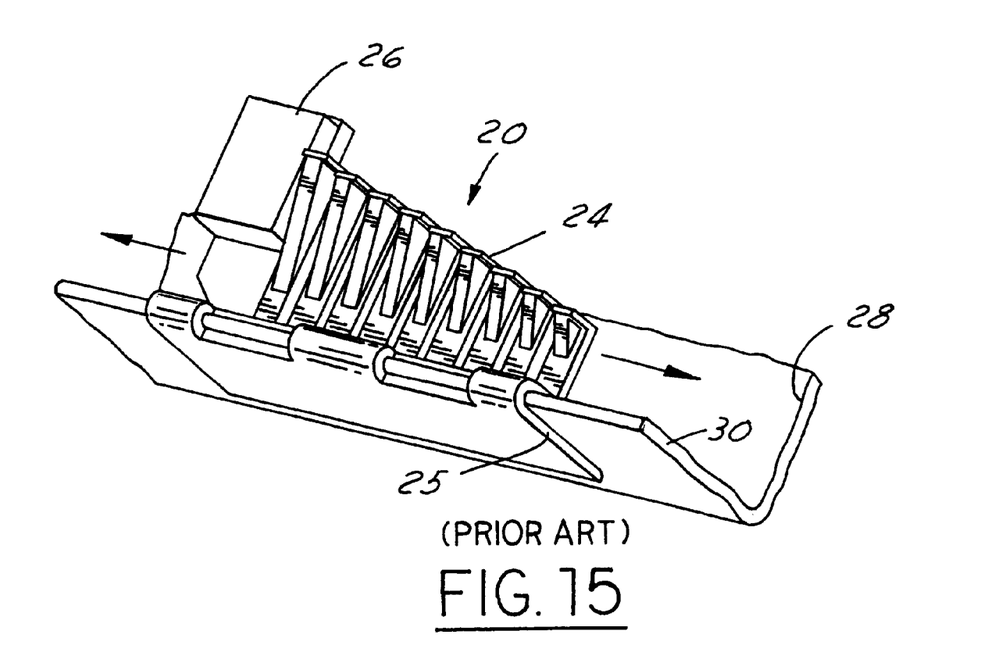
FIG. 15 is a view similar to that of FIG. 14 showing a prior art window spacer being installed on a flange of the automotive vehicle frame.

Due to the weight and size of the window glass, typically two spacers (one on the driver's side and one on the passenger's side) must be used to vertically hold up the windshield. If one of the spacers 20 is misplaced in the lateral direction the weight of the window glass can overcome the resistance of the fingers 24 and dislodgment of the window glass can occur. If the window glass becomes dislodged during the curing stage, the window glass will have to be replaced. Replacement of the window glass will often require that the present misaligned window glass be broken and removed and a replacement window glass be installed. Another problem encountered with the spacer 20 is that on some occasions the weight of the window glass can cause the spacer base 22 to be dislodged from the flange 30. Dislodgement of the spacer base 22 can cause the window glass to move to a misaligned position while the sealant is curing. Also, it is preferable to eliminate an extending flange, like flange 30 to prevent the entrapment of precipitation which can cause rust.

Accordingly, what is needed is an inexpensive and easily assembled spacer for locating and supporting a window glass as a urethane bond cures and secures the window glass to the frame of a vehicle.

A need exists for such a spacer which provides both horizontal and vertical support in such a manner that relatively rigid support is provided along the plane of the window glass and relatively compliant and conforming support is provided in a plane perpendicular to that of the window glass.

A need exists for a spacer which provides means of adjustment for adjusting the position of support of the window glass with respect to the bottom edge of the window opening provided in the automotive frame, thereby compensating for dimensional variations of the window openings.

Yet another need exists for such a spacer which is self-centering, self-locating, and positively locking on the frame of an automotive vehicle.

SUMMARY OF THE INVENTION

The present invention has been developed to meet the needs noted above, and therefore has as an object the provision of a one-piece spacer for supporting a window glass both horizontally and vertically as the window is held in place during bonding and curing of a urethane seal around the window glass.

Another object of the invention is the provision of a window glass spacer which provides a relatively stiff support along the plane of a window glass and a relatively compliant or soft support in a direction perpendicular the plane of the window glass. Still another object of the invention is the provision of a window glass spacer which is length adjustable to compensate for variations in the location of the window glass bottom edge with the bottom edge of the window opening.

Yet another object of the invention is the provision of a window glass spacer which is self-centering, self-locating, and self-locking on the frame of a vehicle.

DETAILED DESCRIPTION OF THE EMBODIMENT

Figure 1:
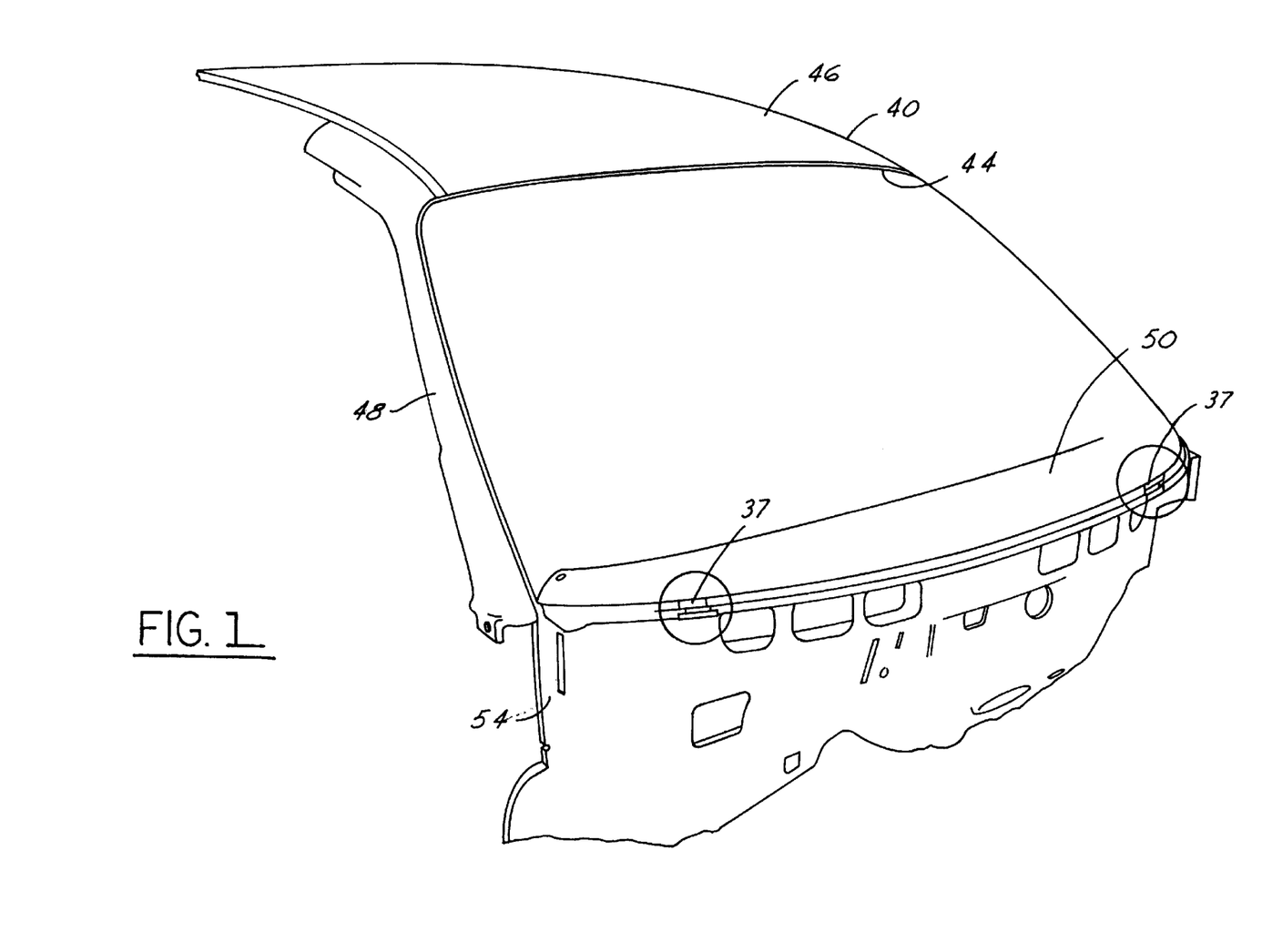
FIG. 1 is a front perspective view of the window glass spacer according to the present invention being installed on a frame of an automotive vehicle on a portion of the frame which is adjacent to a window glass opening.
Figure 2:
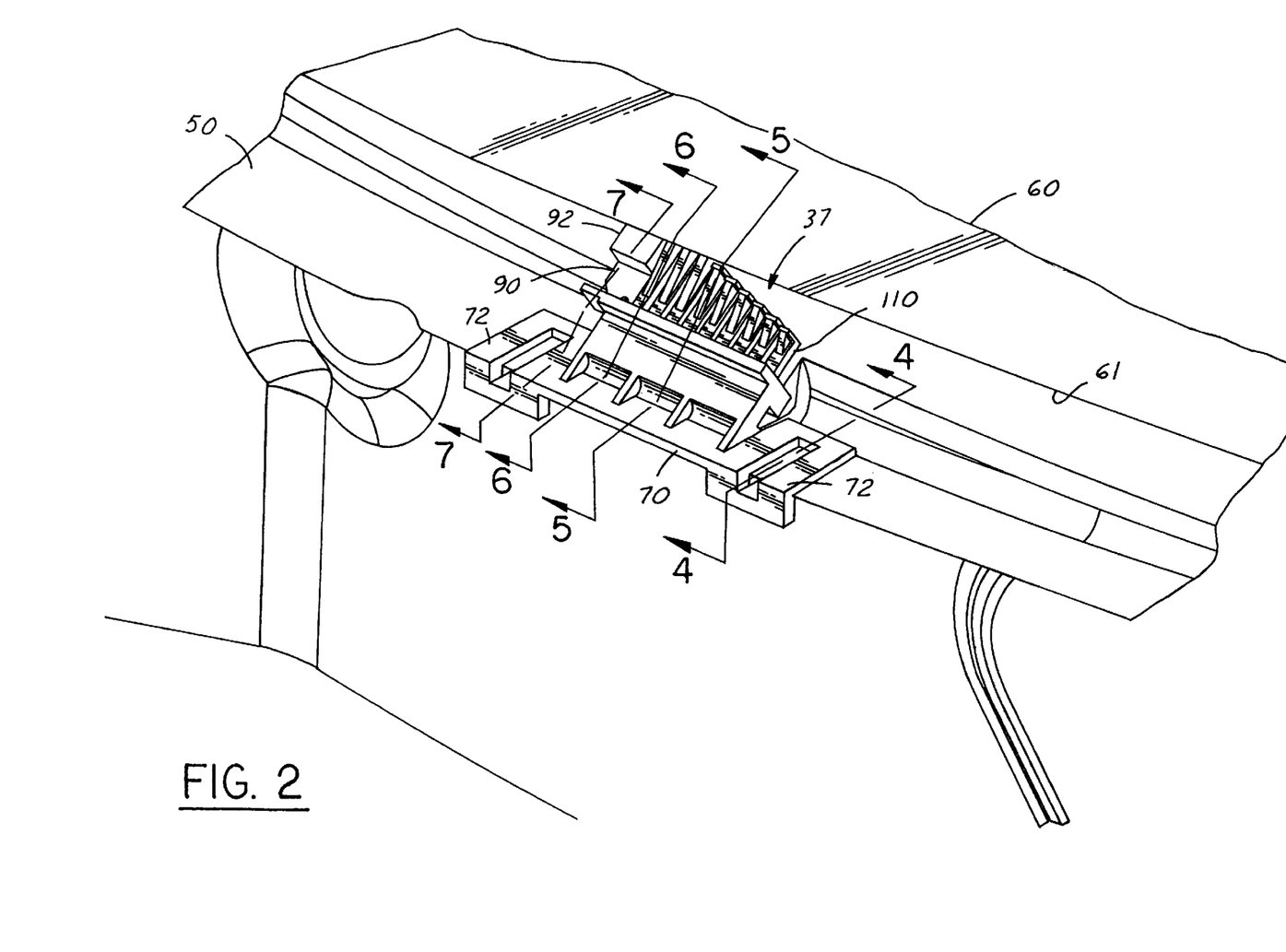
FIG. 2 is an enlargement of the area encircled in FIG. 1 with the windshield installed.
Figure 3:
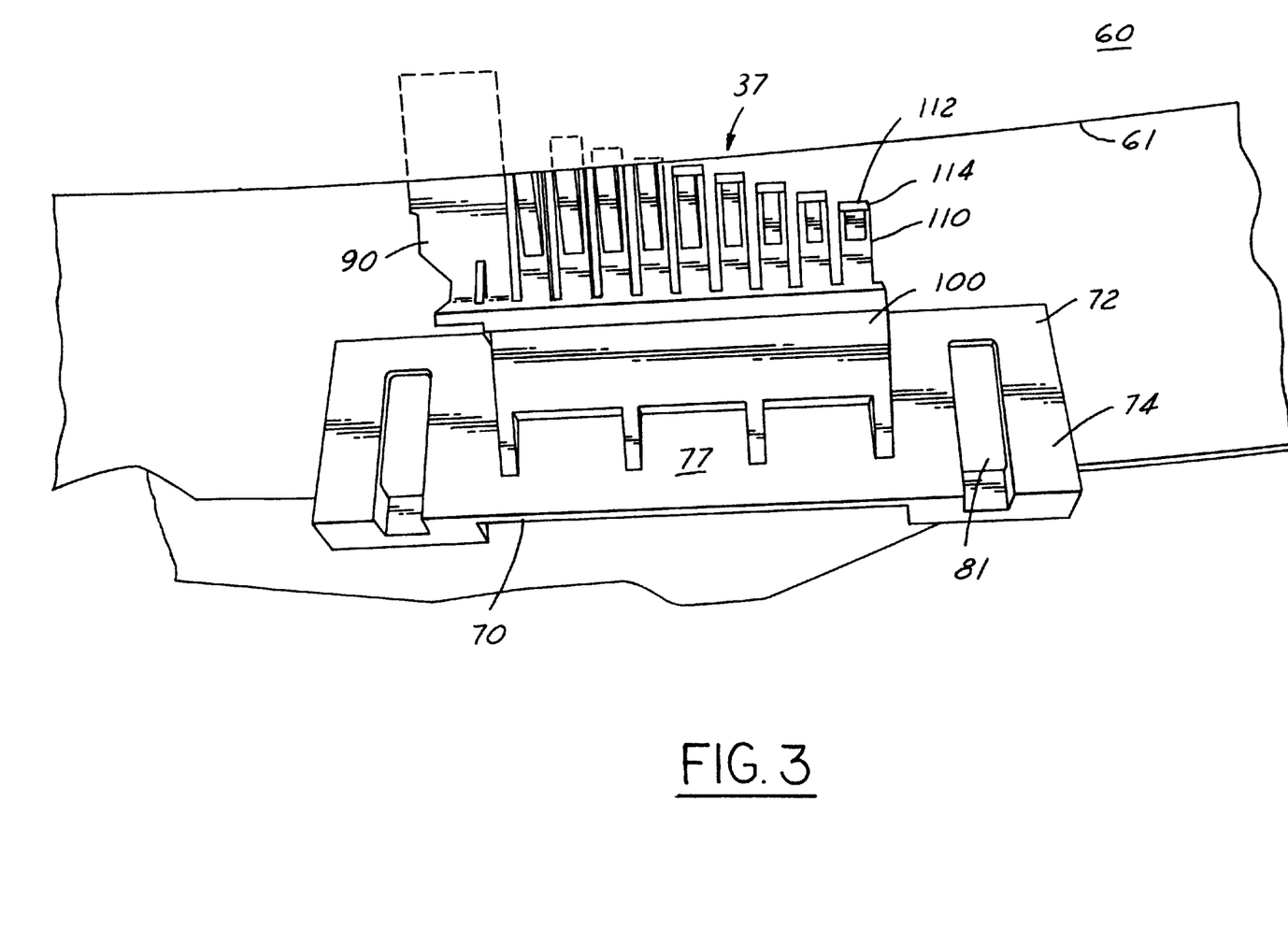
FIG. 3 is a front perspective view of the spacer shown in FIG. 2.
Figure 4:
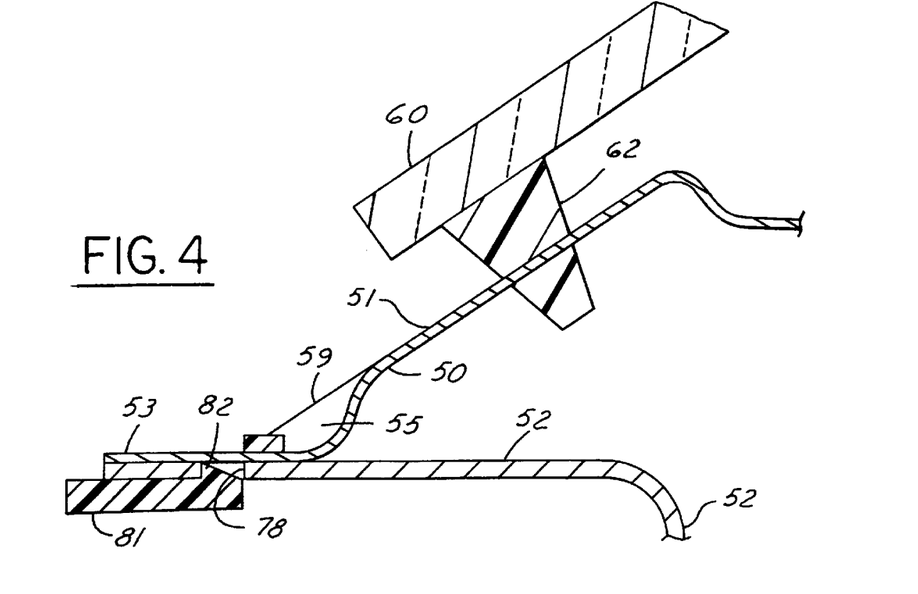
FIG. 4 is a sectional view taken along lines 4—4 of FIG. 2 illustrating the clip self-locking attachment of the spacer to the automotive vehicle frame.

Referring to FIGS. 1, 2 and 3 a preferred embodiment window glass spacer 37, is provided. An automotive vehicle 40 has a windshield aperture or opening 44. The windshield opening 44 as provided by a combination of a roof stamping 46, a driver side and passenger side A-pillars 48 (only one shown) and a cowl top panel 50. Referring additionally to FIG. 4, the cowl top panel 50 is weldably joined to a cowl reinforcement 52 which extends downward forming a fresh air intake.

Referring additionally to FIGS. 4–7, 13 and 13A, the cowl top panel 50 has a major upper surface 51. Major surface 51 extends downward into a flat lower portion 53 (FIG. 4). Laterally of the location of spacer 37, major surface 51 tapers laterally down into declining or ramped portion 55 and radiused portion 57 to blend into the flat surface portion 53. Between the declining sidewall portions 55, a portion of the major surface 51 forms a centering ramp portion 59.

The spacer 37 performs three major functions. The first function of the spacer 37 is to prevent the windshield 60 from sliding downward along its major plane during the curing process of the urethane bead 62. The second function of the spacer 37 is to prevent the weight of the windshield 60 from moving the windshield generally perpendicular to its major plane and thereby cause the urethane bead 62 to squeeze (wet out) between the cowl top panel 50 and the windshield 60 before the urethane bead 62 has a chance to cure. The third function of the spacer 37 is to set the position of the windshield 60 with respect to the roof 46 of the vehicle wherein it is constant and close fitting regardless of variations in the windshield opening 44. After vehicle assembly, the spacer 37 will be hidden from view. Therefore, for aesthetic, noise, and sealing purposes, it is important to keep the position of the top of the windshield constant with respect to the top of the windshield opening 44 provided by the roof 36.

Figure 5:
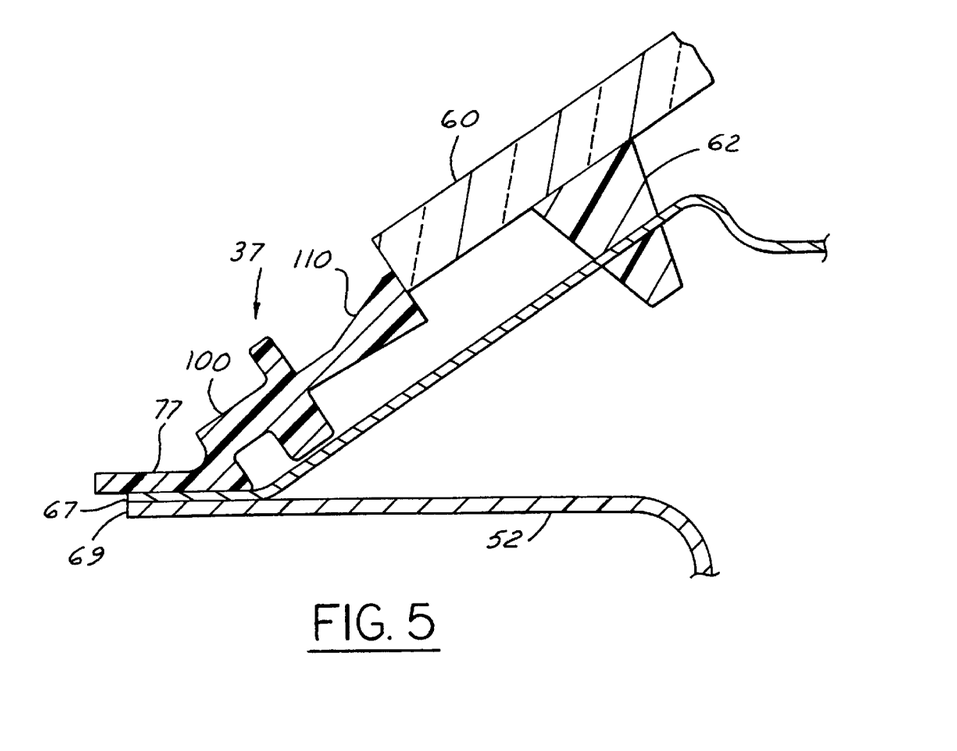
FIG. 5 is a sectional view taken along lines 5—5 of FIG. 2 illustrating a cantilever spring finger with a support member contacting and holding the windshield.
Figure 6:
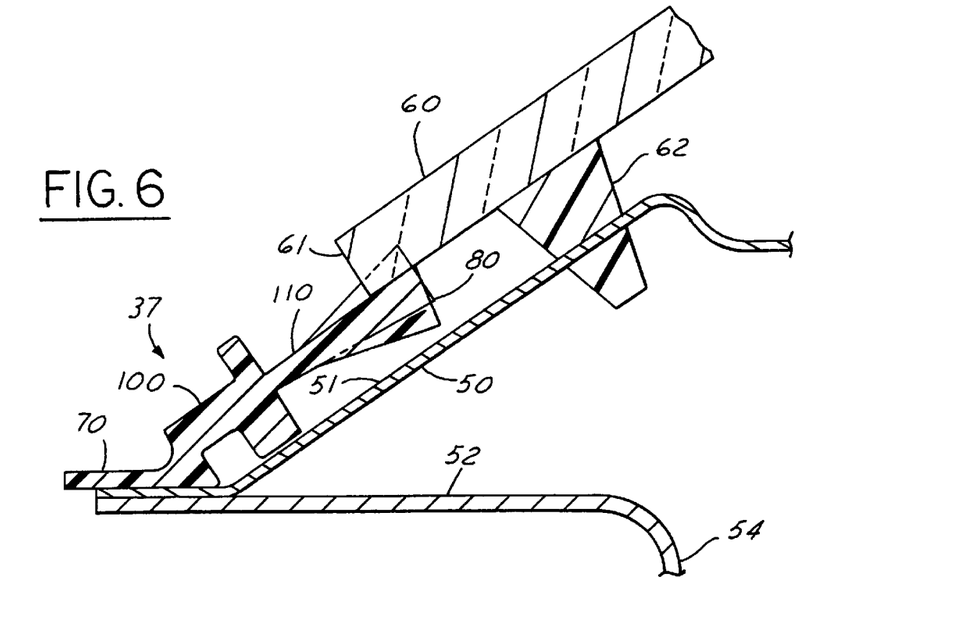
FIG. 6 is a sectional view taken along lines 6—6 of FIG. 2 illustrating a spring finger which has been urged pivotally downward to allow for adjustment of the position of the windshield within the windshield opening.
Figure 8:
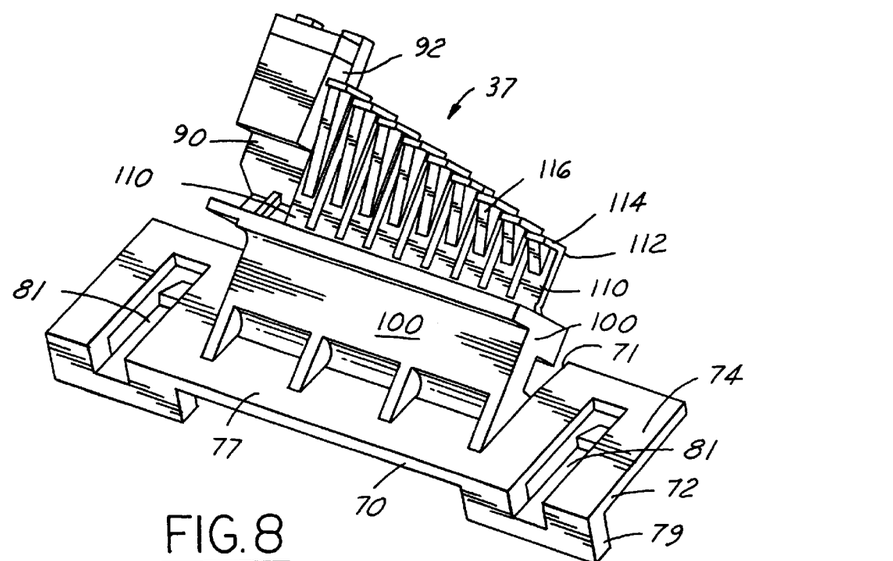
FIG. 8 is a perspective view of the window glass spacer shown in FIGS. 1, 2 and 3.
Figure 9:
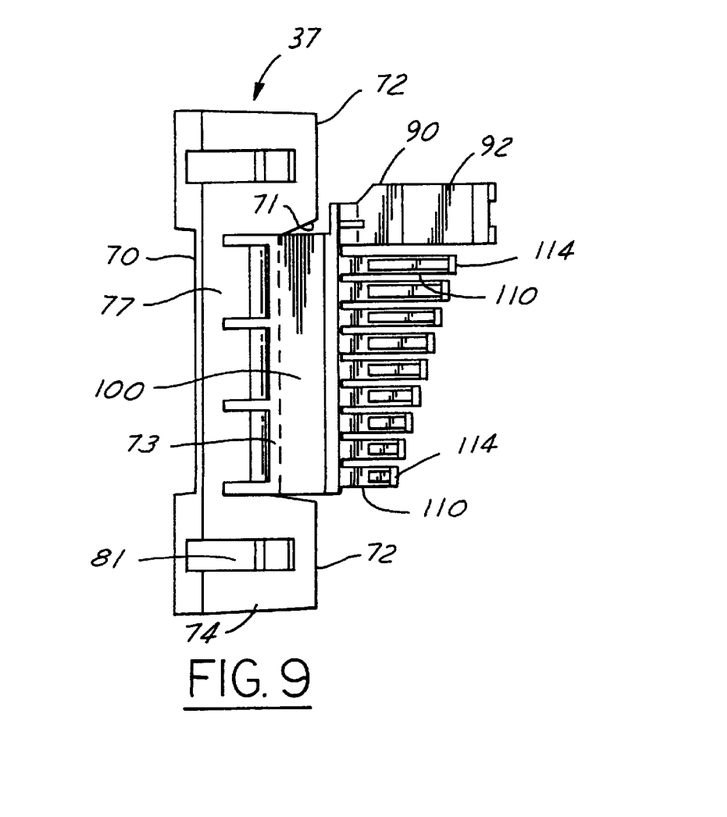
FIG. 9 is a top elevational view of the spacer shown in FIG. 1.
Figure 10:
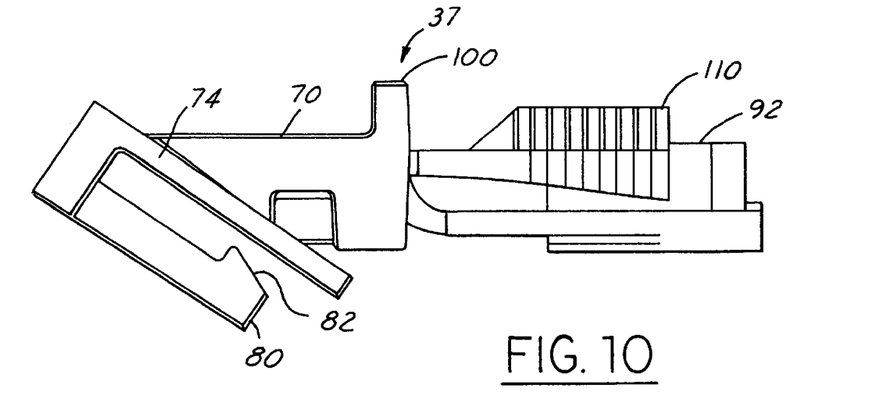
FIG. 10 is a side elevational view of the spacer shown in FIGS. 8 and 9 removed from the environment of FIG. 1 for clarity of illustration.

The spacer 37 has a base 70. The base 70 is made from a molded plastic such as PVC or other suitable alternative. The base 70 of the spacer has a tapered recess orientated towards the window glass formed by opposed-angled centering surfaces 71 and front edge 73. The spacer 37 is self-locked to the automotive frame by spring clips 72. The spring clips 72 are provided on opposite sides of the spacer 37. The spring clips 72 have a mounting surface 74 which is positioned over a portion of the cowl top panel flat surface portion 53. The mounting surface 74 is on a common plane with a spacer base mid-portion 77 (FIGS. 8 and 9). Integrally joined to the mounting surface 74 is a front edge 79 which abuts contacts front edges 67 and 69 of the cowl top panel flat surface portion 53 and cowl reinforcement 52 (FIG. 5). The tapered recess formed by surfaces 71 and edge 73 positively locates and centers the spacer 37 on the frame by surrounding the ramp 59 in a tongue-in-groove fashion. The tapered surfaces 71 provide for centering of the spacer 37 in cases where an assembler might inadvertently attempt to misalign the spacer 37. The tapered surfaces 71 allow assembly operation to be practically foolproof. The lateral position of the spacer 37 is located in a fixed position by the surfaces 71. The cowl reinforcement 52 has a pierced slot 78 or punch out. The spring clips have a lever 81 with a hook or a form 82 which is positioned into the depression 78 to permanently lock the spacer 37 to the automotive frame.

Figure 11:
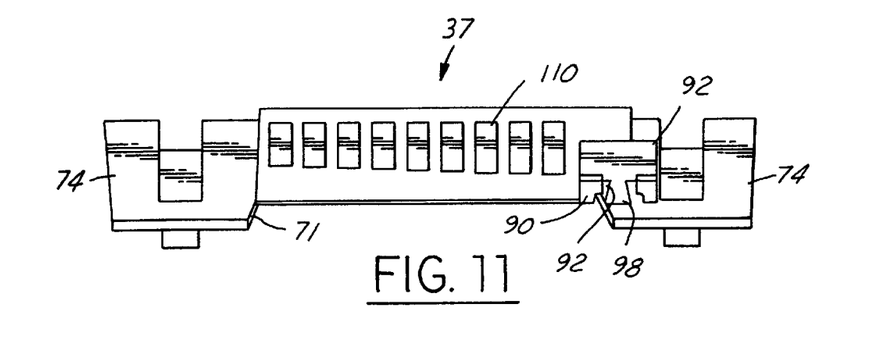
FIG. 11 is a plane elevational view of the spacers shown in FIGS. 8 and 9 taken normal to a plane of extension of the spring fingers.
Figure 12:
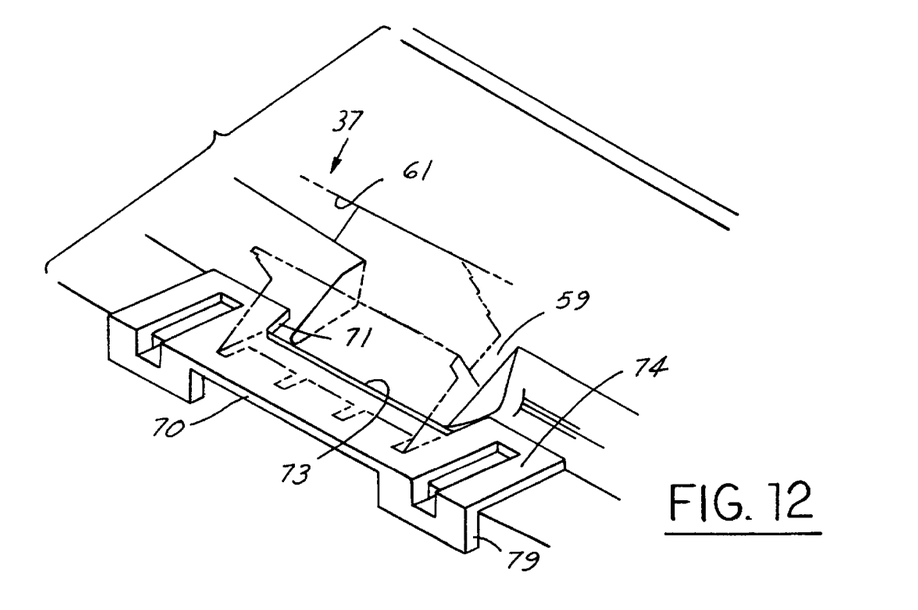
FIG. 12 is a perspective view of the cowl portion of the vehicle frame which the spacer of the present invention is placed on with portions of the spacer only shown in phantom for clarity of illustration.
Figure 13:
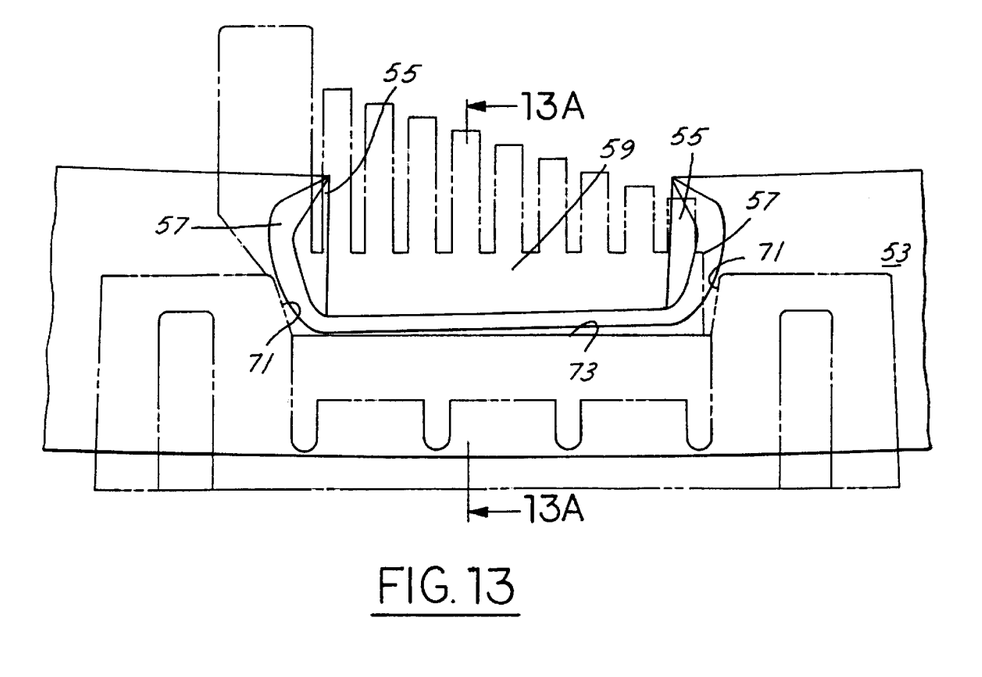
FIG. 13 is a view of a cowl portion of the vehicle frame with the spacer according to the present invention shown in phantom and taken normal to the cowl.
Figure 13A:
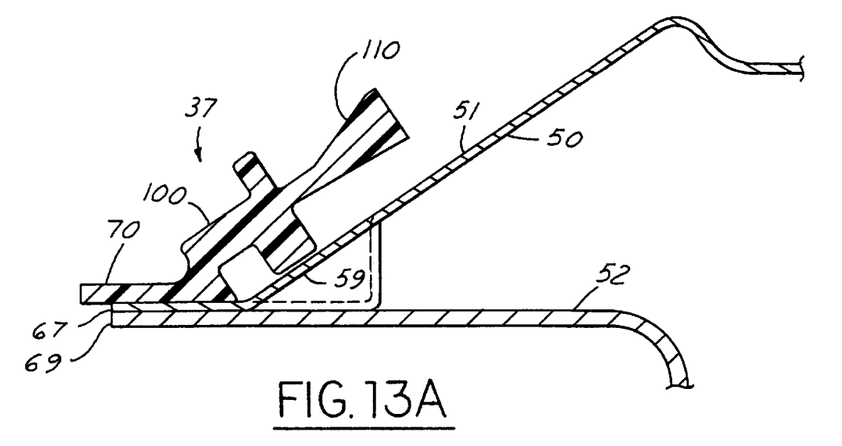
FIG. 13A is a view taken along line 13A—13A of FIG. 13.

Angled from the base 70 of the spacer is a central portion 100. Extending forward from central portion 100 is a cantilever supported arm 90. The arm 90 has connected thereto a compliant pad 92. The compliant pad 92 is typically fabricated from an elastomeric substance such as neoprene or other suitable alternative. As best shown in FIG. 11, the arm 90 has a longitudinal central slot 94. A longitudinal key 98 of the pad 92 compliantly connects the pad 92 to the arm 90.

The central portion 100 is orientated generally perpendicular to the major plane of the windshield 60. Extending from the central portion is a plurality of cantilever extended spring fingers 110. Each of the spring fingers 110 has on its free end 112 opposite the base, a window glass support member 114. A top surface of each finger also has a ramped surface 116 to give support to the window glass support member 114. The spring fingers serially decrease in length from an inboard to an outboard side of the spacer 37. Typically, the difference in length will be approximately 0.1 cm per finger 110.

Figure 7:
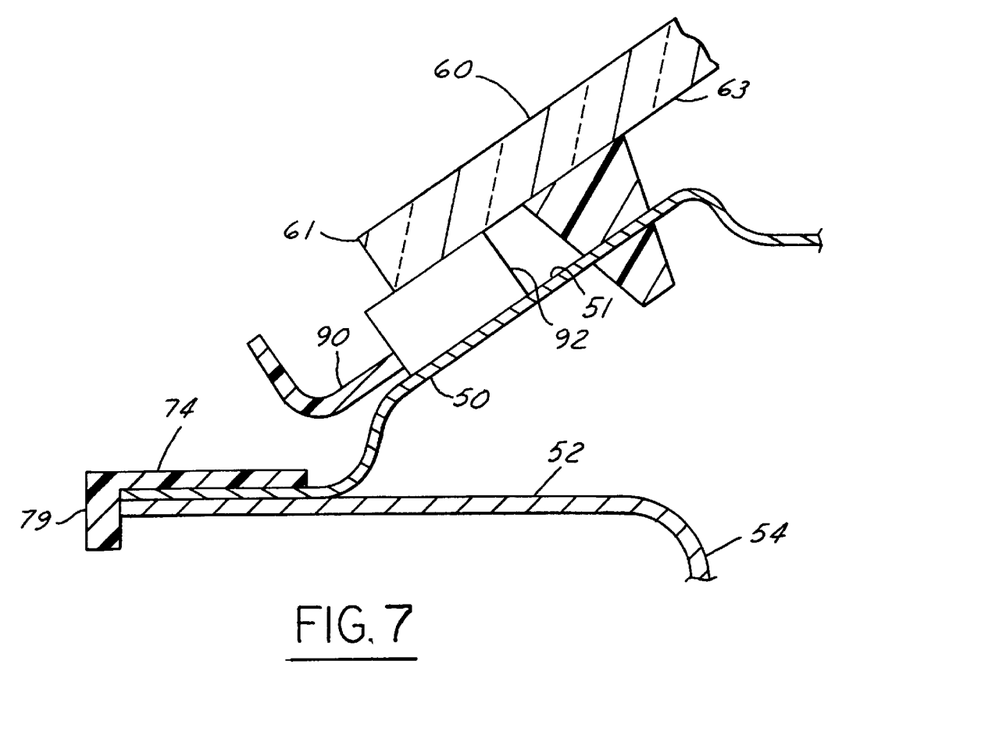
FIG. 7 is a sectional view taken along lines 7—7 of the window glass spacer shown in FIG. 2 illustrating the cantileverly connected compliant pad support of the windshield in a direction generally perpendicular to the major plane of the windshield.

In the assembly process, a robot (not shown) will typically pick up the windshield 60. The windshield 60 has optical readable markings to allow the robot to confirm that the proper windshield 60 is being picked up and to inform the robot controller of the position of the windshield 60 with respect to the robot. The robot will then position the windshield to allow the urethane bead 62 to be applied. The robot then will locate a predetermined marking (not shown) on the vehicle A-pillars 48 and/or roof 46 to determine the position of the windshield opening 44. The robot will then place the windshield 60 over the spacer 37. The bottom or lower edge surface 61 of the windshield rests on top of the pad 94 (FIG. 7). A bottom portion of the spacer 37 will push down the spring finger 110 (FIG. 6) which extends beyond the bottom edge 61 of the windshield. A spring finger 110 (FIG. 5) which is not covered by the windshield will contact and support the windshield 60 by contact with the windshield lower edge 61 to set the vertical position of the windshield 60 with respect to the roof 46. If the vertical distance between the cowl top panel 50 and the roof 46 was 0.1 cm less (than that shown in FIG. 1), the spring finger 110 to the right of that shown in FIGS. 2 and 5 will support the windshield. The contact with the support member 114 (by the windshield lower edge surface 61) tends to pivot the spring finger 110 upwards to prevent it from bowing down and allowing the windshield 60 to slide down. The clips 72 lock the spacer 37 in position.

Although the present inventive window glass spacer has been shown in the environment of supporting a windshield, it will be apparent to those skilled in the art that the present invention can also be used in setting the rear window glass of a vehicle.

While the invention has been particularly shown and described with reference to the preferred embodiments thereof, it is well understood by those skilled in the art that various changes and modifications can be made in the invention without departing from the spirit and scope thereof.

We claim:

1. A window glass spacer comprising:
   a base having a tapered recess formed therein for locating and centering said base on a frame of a vehicle;
   a plurality of cantilevered spring fingers, each said finger having a free-end portion extending from said base;
   a window glass support member provided on each free-end portion; and
   a pair of clips provided on opposite sides of said recess for clipping said spacer to said frame.

2. A window glass spacer as described in claim 1, further including a compliant pad connected with said base to support said window glass in a direction generally perpendicular to a major plane of the glass.

3. A window glass spacer as described in claim 2, further comprising a cantilever arm extending from said base and wherein said pad is connected to said base via said cantilever arm.

4. A window glass spacer as described in claim 1, wherein each clip further comprises a hook for permanent attachment to said automobile frame.

5. A window glass spacer as described in claim 1, wherein said spring fingers are of different lengths.

6. A window glass spacer as described in claim 5, wherein said spring fingers are serially decreasing in length.

7. A window glass spacer as described in claim 1, wherein at least one of said fingers has a ramp surface above said finger.

8. A window glass spacer as described in claim 1, wherein said window glass support member and said cantilever fingers are configured in a manner wherein downward movement of said window glass which is contacting with said support member causes said spring finger to be urged upwards with respect to said window glass.

9. A window glass spacer comprising:
   a base, said base having a tapered recess formed therein for locating and centering said base on a frame of a vehicle, and said base having at opposite ends a clip-type clamp for connecting said base with a frame of an automotive vehicle;
   a cantilever support arm connected with said base;
   a compliant pad connected on said arm to support said window glass in a direction generally perpendicular to a major plane of said window glass; and
   a plurality of cantilever spring fingers, each of said fingers having a free-end portion extending from said base, each of said fingers having a window glass support member provided on the end of said cantilever spring fingers free-end and said cantilever fingers having a serially decreasing length.

* * * * *